July 5, 1938.　　　　　G. E. MAILLAT　　　　　2,123,115
STROBOSCOPIC DEVICE FOR CHECKING AND ADJUSTING METERS
Filed July 28, 1936　　　4 Sheets-Sheet 1
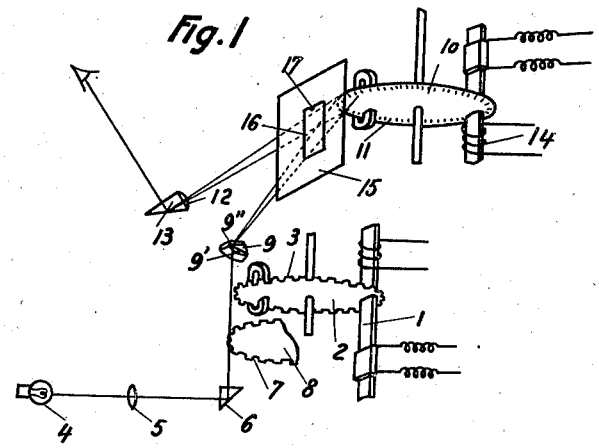
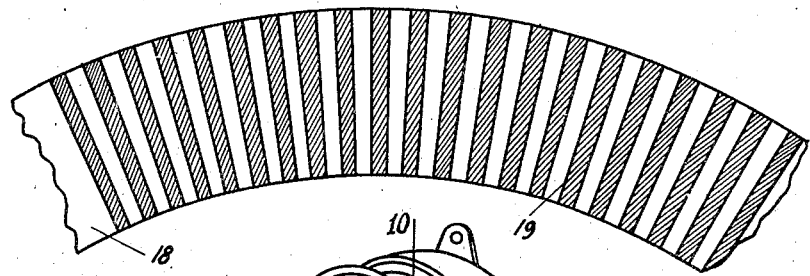
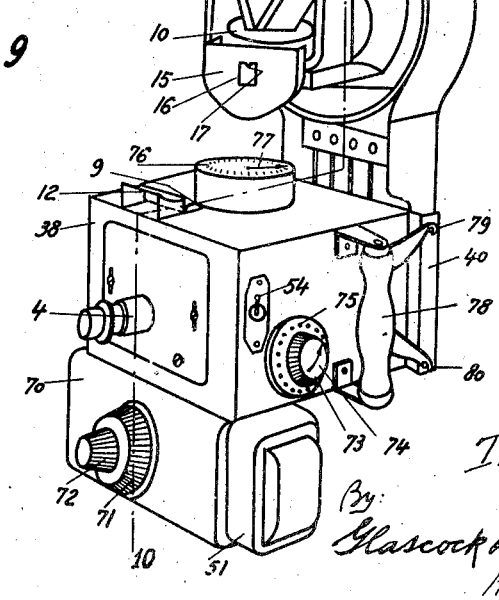

July 5, 1938.  G. E. MAILLAT  2,123,115

STROBOSCOPIC DEVICE FOR CHECKING AND ADJUSTING METERS

Filed July 28, 1936  4 Sheets-Sheet 3

Inventor:
G. E. Maillat
By Glascock Downing & Seebold
Attys.

Patented July 5, 1938

2,123,115

UNITED STATES PATENT OFFICE

2,123,115

STROBOSCOPIC DEVICE FOR CHECKING AND ADJUSTING METERS

Gustave Ernest Maillat, Voisins-le-Bretonneux, by Trappes, France, assignor to Union d'Electricite, Paris, France, a French company Application July 28, 1936, Serial No. 93,065
In France August 10, 1935

7 Claims. (Cl. 175—183)

The present invention relates to a stroboscopic device for checking and adjusting meters. It is known that the construction of such a device gives rise to a considerable difficulty due to the very slow speed of rotation of the meter discs particularly on light loads, which prevents obtaining sufficiently distinct and quick variations of luminous intensity to make the stroboscopic phenomenon visible.

In order to overcome this drawback, recourse has been had in the known stroboscopic apparatus, to an intermediary device transforming the slight variations of luminous intensity into variations of electric current and supplying in its turn a luminous source which gives rise to suitable variations of illumination. Thus these apparatus usually comprise a luminous source the beam of which is projected through serrations provided in the disc of the standard meter onto a photoelectric cell which supplies a neon tube or the like which is suitably polarized so as only to light in the region of maximum illumination of the cell and serving for periodically illuminating the disc of the meter to be checked which carries a number of lines equal to the number of teeth or serrations of the disc of the standard meter.

It will be realized that such an apparatus is costly and cumbersome and can only practically serve for standardizing meters on the premises of the manufacturer, a fortiori since it is suitable for the simultaneous checking of a plurality of meters.

On the other hand, attempts have been made to construct simpler devices in which the luminous beam which is periodically interrupted by the serrations of the disc of the standard meter, is projected directly onto the disc of the meter to be checked, but such devices only enable an insufficient illumination to be obtained, which in particular renders checking impossible in broad daylight without using a special dark room.

The device according to the present invention is intended to overcome this drawback and it is characterized by the fact that the luminous beam is projected from below onto the under face, which is provided with a graduation, of the disc of the meter to be checked, and that behind the luminous source and the serrated disc of the standard meter is arranged a fixed screen provided with corresponding serrations.

The combination of these two means, viz. the projection of the periodically interrupted luminous beam on the under face of the disc of the meter to be checked, and the interposition of a fixed serrated screen, enables the operation to be readily carried out in broad daylight with a luminous beam of relatively small intensity since, on the one hand, the under face of the disc of the meter is always in almost complete darkness and, on the other hand, the periodic variations of the intensity of said beam, due to the serrations of the disc of the standard meter, are rendered very distinct owing to the serrations of the fixed screen.

By way of example two embodiments of the device according to the invention have been described hereinafter and illustrated in the accompanying drawings.

Fig. 1 thereof is a diagrammatic perspective view.

Figs. 2, 3 and 4 concern the construction of the serrations and graduations of the discs of the meters and of the fixed screen.

Fig. 7 shows a perspective view of a first embodiment of the device and the method of fixing same on the meter to be checked whereas

Fig. 9 shows the detailed method of construction of said device, and

Figure 8:
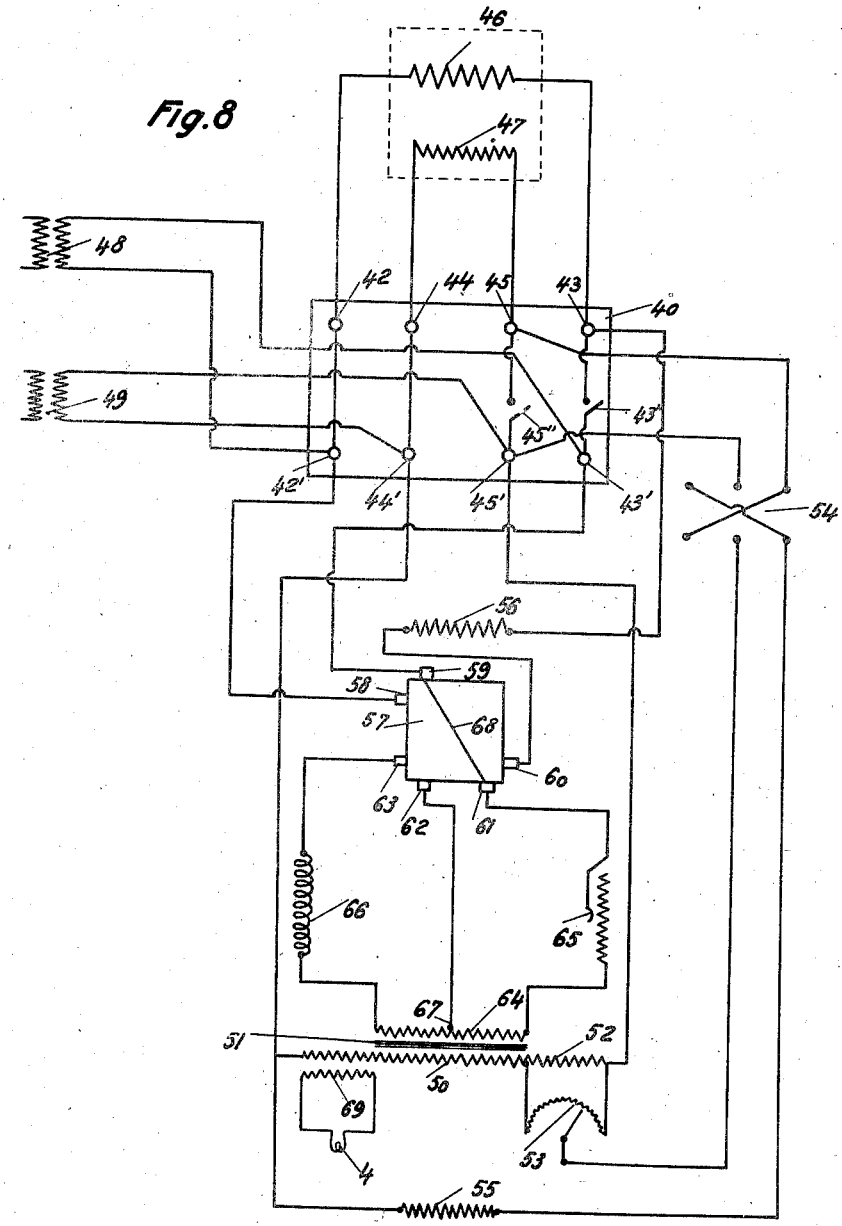
Fig. 8 shows a diagram of the electric connections of an improved device.

The apparatus of which the diagram is shown in Fig. 1 comprises a standard meter 1 the disc 2 of which is provided with serrations 3 serving to periodically interrupt a luminous beam issuing from the lamp 4 and projected by the lens 5 and the prism 6 through the intermediary of the serrations 7 of a fixed dividing screen 8. After passing through the serrations 3 of the disc 2, the luminous beam which is periodically interrupted by said serrations, is sent by a prism 9 provided on two of its faces with cylindrical lenses 9', 9" the axes of which are perpendicular to each other and which projects a beam of rectangular shape onto the under face of the disc 10 of the meter 14 to be checked which face is provided with a graduation 11, the stroboscopic phenomenon being observed by means of a magnifying glass 12 placed against a prism 13, or by means of a concave mirror.

Figure 3:
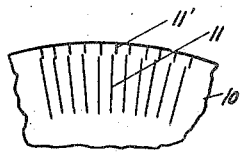

In order to increase the darkness surrounding the under face of the disc 10, the meter 14 to be checked is provided with an opaque screen 15 arranged in front of said disc and provided with a window 16 through which the luminous beam, which is projected onto the graduation 11 by the prism 9, is projected onto the prism 12—13. The window 16 is advantageously provided on its upper edge with a pointer 17 facilitating the reading. In the case of meters provided with a glass casing, the prescribed address plate can play the part of the screen 15, it will suffice in this case to make the inspection window 16 in said plate. In order to make the stroboscopic phenomenon visible for light loads of the meter, corresponding to very low speeds of rotation of the disc, it is necessary to construct very close serrations on the disc 2 of the standard meter and on the fixed screen 8, for example three teeth per degree of arc. Since the construction of such serrations on a disc of small diameter is exceedingly difficult, it is carried out in the following manner: a circular ring 18 provided with radial lines 19 having the required angular spacing between them, the thickness of the lines being equal to their spacing, is drawn on a very much enlarged scale (Fig. 2) and photographs are taken thereof of the desired size; the graduated rings cut out of the negatives printed on transparent films are crimped on the periphery of the discs of the standard meters of which they replace the serrations. The graduation of the disc of the meters to be checked is printed in black on said discs of which the surface is previously frosted, the portion 11' of the lines (Fig. 3) located near the edge of the disc being slightly offset relatively to the main graduation 11.

Figure 4:
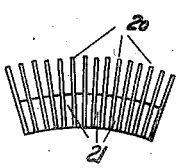

When the disc of the standard meter carries, as hereinbefore indicated, a graduated ring consisting of a film, the fixed screen 8 should have a certain thickness in order to guide the luminous rays over a length of about one millimeter. Consequently in order to construct serrations of such a thickness but as close together as those of the disc of the standard meters, thin sheet metal blades 20 are assembled together as shown in Fig. 4, said blades being separated from each other by shorter blades 21, so as to form an extremely fine comb of circular or rectilinear contour. On the contrary, when the disc of the standard meter carries serrations cut on its periphery, the serrations of the fixed screen 8 can consist of a film in the above referred to manner.

Figure 5:
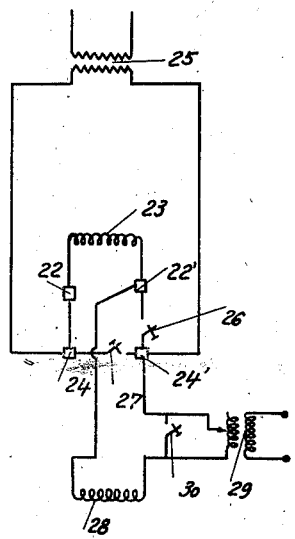
Figs. 5 and 6 show diagrams of electric connections.

As shown in Fig. 5, the terminals 22, 22' of the current winding 23 of the meter to be checked are connected to the terminals 24, 24' which are connected to a current transformer 25, a switch 26 being disposed between the terminals 22', 24' and another switch 27 between 24 and 24'. The current winding 28 of the standard meter is connected between the terminals 22' and 24' in series with a rheostat-transformer diagrammatically illustrated at 29 and adapted to be short circuited by a switch 30. When checking at the normal load, the switches 26 and 27 are opened, whereas the switch 30 is closed, so that the windings 23 and 28 of the two meters are connected in series. For effecting an adjustment at all loads, it is necessary to short circuit the current transformer by closing the switch 27 and to bring the rheostat-transformer 29 into service by opening the switch 30.

Figure 6:
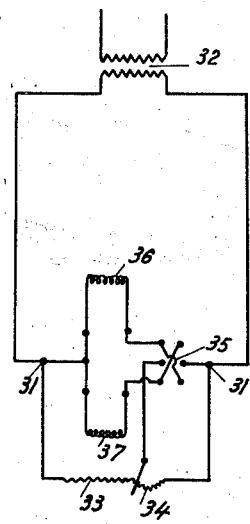
Figure 7:
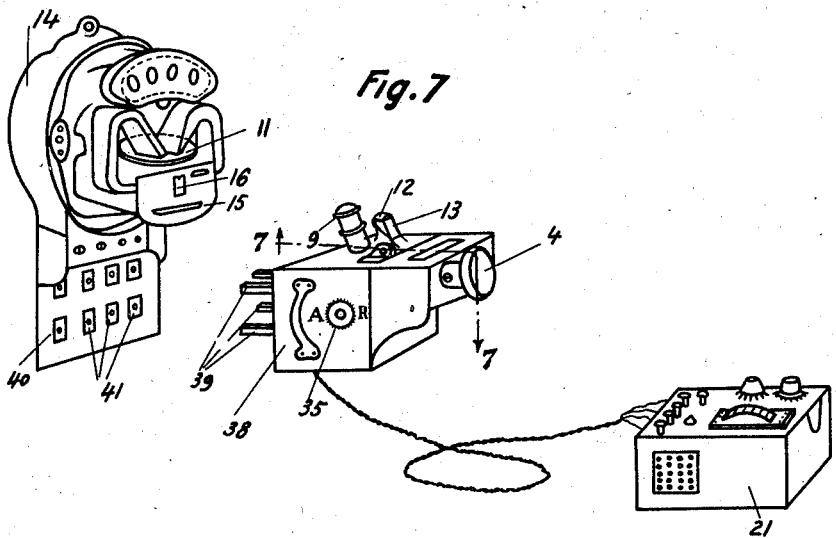
Figure 10:
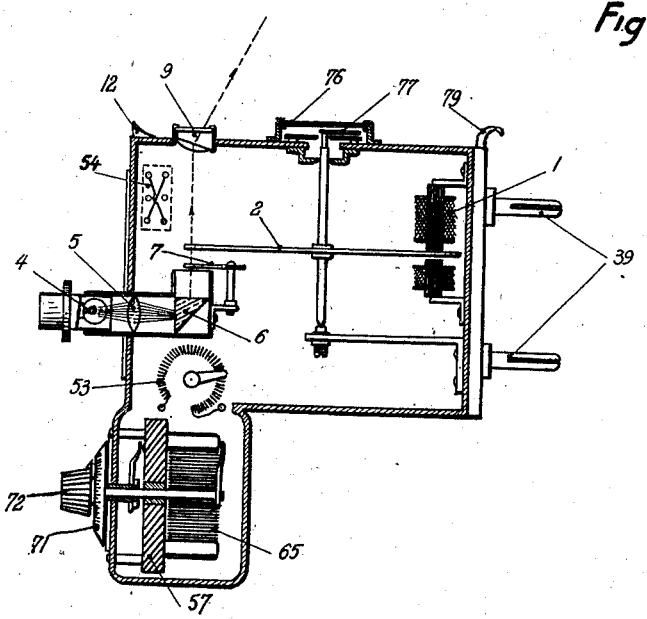
Fig. 10 is a sectional view taken on line 10—10 of Fig. 9.
Figure 7A:
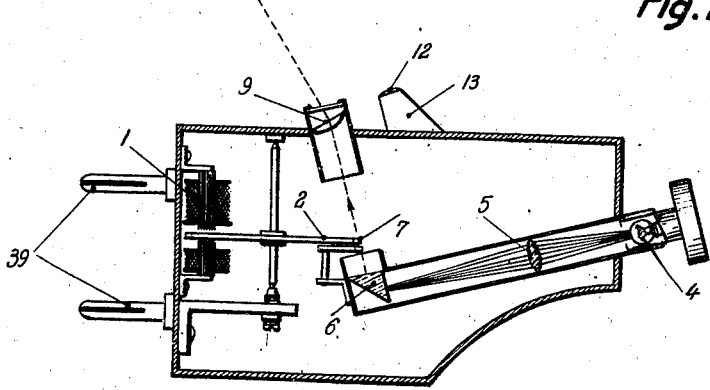
Fig. 7a is a sectional view taken on the line 7a—7a of Fig. 7.

Fig. 6 shows the diagram of the connections of the voltage windings of the two meters. The terminals 31, 31' are connected to a voltage-transformer 32 and supply a potentiometer consisting of a fixed resistance 33 and a variable resistance 34. A double throw switch 35 enables either of the two voltage windings 36 and 37 of the two meters to be connected to the voltage-transformer through the intermediary of the potentiometer 33—34. When the checking operation is carried out, it is possible, by observing the stroboscopic phenomenon, to see immediately which of the two meters is rotating the fastest (the value of the resistance 33—34 being adjusted to its maximum). The voltage winding of the fastest rotating meter is then connected to the terminals of the potentiometer 33—34 by means of the double throw switch 35, and the value of the resistance 34 is reduced so, as to decrease the voltage supplying said meter, until the disc 11 of the meter to be checked appears to be stationary. Since the speed of the disc of a meter is proportional to the voltage, the potentiometer 34 can be directly graduated in error percent, thereby making the standardizing extremely easy and rapid. According to a preferred embodiment of the apparatus, the standard meter, the luminous source 4 with its optical system 5, 6, 7, 8, 9, 12, 13, the fixed screen 8, the potentiometer 33, 34 and the double throw switch 35 are lodged in one and the same casing 38 (Fig. 7) which is fixed by means of pins 39 on the checking plate 40 of the meter 14 to be checked which is provided for this purpose with sockets 41 suitably connected to the windings of the meter for effecting all the connections shown in Figs. 5 and 6 when the casing 38 is mounted, including the opening of the switch 26 which is also lodged in said casing. In Fig. 7, the rheostat-transformer 29 controlling the variations of the load of the meters during the standardizing operation, has been shown separately; of course it can also be lodged in the casing 38, as will be indicated in another embodiment hereinafter described.

Fig. 8 shows in detail in the case of a single phase meter, a more complete diagram of connections with the connections of the standard meter and of the various adjusting members with the pins by means of which the apparatus contained in the casing 38 is fixed on the plate 40 of the meter to be checked. Said plate 40 has for this purpose eight sockets 42, 43, 44, 45 and 42', 43', 44', 45' the current and voltage windings 46 and 47 of the meter to be checked being respectively connected to the sockets 42—43 and 44—45, whereas the sockets 42', 43' and 44', 45' are connected to the supply mains, or, in the case of a high tension meter to the current and voltage transformers 48 and 49, the sockets 42—42' and 44—44' being respectively connected to each other. Furthermore, the terminals 43—43' and 45—45' are respectively connected by contacts 43" and 45" which automatically open when the checking apparatus is placed in position on the plate 40. Designating for greater simplicity the pins of the casing 38 by the same numerals as the corresponding sockets of the plate 40, the connections of the standard meter and of the various adjusting and switching members are as follows: the primary 50 of a transformer 51 is connected to the pins 44'—45' a portion 52' of said primary being shunted by a rheostat 53 graduated in error per cent and which can be connected by a double throw switch 54 either to the pin 45 for adjusting the supply voltage of the meter to be checked, or to the pin 45' for adjusting the supply voltage of the voltage winding 55 of the standard meter. The current winding 56 of the standard meter is connected to the pins 42' 43; however, in series with said winding is arranged a multi-way switch 57 enabling either the current windings 56 and 46 of the two meters to be connected in series across the terminals of the current transformer 48, or to connect them, in order to permit checking at all loads, to the secondary 64 of the aforesaid transformer 51.

For this purpose, the multi-way switch 57 has six studs 58, 59, 60, 61, 62 and 63, the studs 58—60 being respectively connected to the pin 42' and to the current winding 56 of the standard meter, the stud 59 being connected to the pin 43', the studs 61—63 being respectively connected to the terminals of the secondary winding 64 of the transformer 51 through the intermediary of an adjusting rheostat 65 and an adjustable choke 66, whereas the stud 62 is connected to an intermediate point 67 of said secondary winding. Finally, the studs 59 and 61 are permanently connected to each other by a conductor 68. The multi-way switch is adapted to make the following connections:

1. The studs 60 and 61 are connected to each other so that the current windings 56 and 46 of the two meters are connected in series across the terminals of the current transformer 48, thereby enabling the meter to be checked at the load of the supply mains.

2. The studs 58—59 and 60—62 are connected to each other, two by two, which has the effect, on the one hand, of short circuiting the current transformer 48 and, on the other hand, of connecting the two windings 46 and 56 to the secondary winding 64 of the transformer 51 through the intermediary of the rheostat 65, thereby enabling the checking operation to be effected for all the loads in watted current.

3. The studs 58—59 and 60—63 are connected two by two, so that as the current transformer 48 always remains short circuited, the adjustable choke 66 is connected in series, at the same time as the rheostat 65, with the windings 46 and 56 of the two meters, thereby enabling the most usual checkings to be effected in dephased current.

An auxiliary secondary winding 59 of the transformer 51 enables the lamp 4 to be supplied, which serves for producing the luminous beam necessary for creating the stroboscopic phenomenon.

Of course, the details of the connections and the construction of the fixing plate 40 can be modified according to the type of meter.

The arrangement of these various adjusting and switching members can be seen in Fig. 9: the auxiliary transformer 51 is fixed below the casing 38, and likewise a casing 70 containing the rheostat 65, the choke 66 and the multi-way switch 57. On the front wall of said casing 70 is mounted a knob 71 controlling the multi-way switch, and the knob 72 controlling the rheostat 65. On a side wall of the casing 38 is mounted the double throw switch 54 and the knob 73 of the rheostat 53 adjusting the supply voltage, said knob 73 being provided with a pointer 74 which moves in front of a graduation 75 giving directly the error per cent.

On the casing 38 is arranged a graduated dial 76 in front of which rotates a pointer 77 fast on the shaft of the standard meter, so as to enable the meters to be checked according to the usual method. The pointer 77 is preferably provided with a zero retracting device.

The casing 38 is provided with handles 78 and hooking members such as 79, 80 so that the whole weight of the apparatus need not be supported by the connecting pins and sockets.

I claim:

1. Stroboscopic device for checking and adjusting electric meters, comprising a standard meter having a disc provided on its periphery with means for periodically interrupting light, a luminous source, optical means for projecting a luminous beam issuing from said source onto the under face of the disc of the meter to be checked through the periphery of the disc of the standard meter, the under face of the disc of the meter to be checked having the same number of graduation lines as the number of serrations of the disc of the standard meter, and a fixed screen provided with serrations arranged in the path of the luminous beam and interposed between the luminous source and the serrated disc of the standard meter.

2. Stroboscopic device for checking and adjusting electric meters, comprising a standard meter having a disc serrated at its periphery, a luminous source, optical means for projecting a luminous beam issuing from said source onto the under face of the disc of the meter to be checked, through the serrations of the disc of the standard meter, the under face of the disc of the meter to be checked having the same number of graduation lines as the number of serrations of the disc of the standard meter, a fixed screen provided with serrations arranged in the path of the luminous beam and interposed between the luminous source and the serrated disc of the standard meter, and an opaque screen provided with an inspection window, arranged in front of the disc of the meter to be checked.

3. Stroboscopic device for checking and adjusting electric meters, comprising a plate fixed below the meter to be checked and provided with contact sockets, a transportable casing containing a standard meter having a serrated disc, a luminous source, an optical projection system for projecting a luminous beam issuing from said source onto the under face of the disc of the meter to be checked through the serrations of the disc of the standard meter, a fixed serrated screen arranged in the path of the luminous beam between said source and the standard meter and members for regulating the frequency of the interruptions of said beam due to the serrated disc of the standard meter by adjusting the supply current and voltage, fixing pins arranged on a side wall of said casing and fitting into the sockets of said plate, and means for effecting by means of said sockets and said pins the connections of the two meters to the supply mains.

4. Stroboscopic device for checking and adjusting electric meters, comprising a plate fixed below the meter to be checked and provided with contact sockets, a transportable casing containing a standard meter having a serrated disc, a luminous source, an optical projection system for projecting a luminous beam issuing from said source onto the under face of the disc of the meter to be checked through the serrations of the disc of the standard meter, a fixed serrated screen arranged in the path of the luminous beam between said source and the standard meter, means for regulating the frequency of the interruptions of said beam due to the serrated disc of the standard meter, such means comprising, a standardizing potentiometer graduated in percent error, a double throw switch, means for connecting said potentiometer by means of said double throw switch with the voltage winding of either of the two meters, a rheostat-transformer and means for connecting said rheostat to the current windings of the two meters, fixing pins arranged on one of the side walls of said casing and fitting into the sockets of said plate, and means for effecting, by means of said sockets and said pins, the connections of the two meters, of the potentiometer and of the rheostat-transformer to the supply mains.

5. Stroboscopic device for checking and adjusting electric meters, comprising a plate fixed below the meter to be checked and provided with contact sockets, a transportable casing containing a standard meter having a serrated disc, a luminous source, an optical projection system for projecting a luminous beam issuing from said source onto the under face of the disc of the meter to be checked through the serrations of the disc of the standard meter, a fixed serrated screen arranged in the path of the luminous beam between said source and the standard meter, means for regulating the frequency of the interruptions of said beam due to the serrated disc of the standard meter, such means comprising an auxiliary transformer, a rheostat graduated in percent error connected in parallel with a portion of the primary winding of said transformer, a double throw switch for connecting said rheostat to the voltage winding of either of the two meters, a second rheostat and an adjustable choke, a multi-way switch having studs for connecting in series the current windings of the two meters to the secondary of said transformer and for inserting in this circuit said second rheostat and said choke, fixing pins arranged on a side wall of said casing and fitting into the sockets of said plate, and means for effecting, by means of said sockets and said pins, the connections of the two meters and of the primary winding of said auxiliary transformer to the supply mains.

6. Stroboscopic device for checking and adjusting electric meters, comprising a standard meter the disc of which is provided on its periphery with a ring cut out from a transparent film, having a large number of radial lines in very close relation, a luminous source, optical means for projecting a luminous beam issuing from said source onto the under face of the disc of the meter to be checked, through the graduated transparent ring of the disc of the standard meter, the under face of the disc of the meter to be checked having a number of graduation lines equal to the number of graduations of the disc of the standard meter, and a fixed screen provided with serrations arranged in the path of the luminous beam, between the luminous source and the serrated disc of the standard meter.

7. Stroboscopic device for checking and adjusting electric meters, comprising a standard meter the disc of which is provided on its periphery with a ring cut out from a transparent film, having a large number of radial lines in very close relation, a luminous source, optical means for projecting a luminous beam issuing from said source onto the under face of the disc of the meter to be checked, through the graduated transparent ring of the disc of the standard meter, the under face of the disc of the meter to be checked having a number of graduation lines equal to the number of those on the graduated transparent ring of the disc of the standard meter, and a fixed screen arranged in the path of the luminous beam between the luminous source and said transparent ring and consisting of an assembly of alternately long and short thin sheet metal blades forming a comb.

GUSTAVE ERNEST MAILLAT.